United States Patent [19]

Halberschmidt et al.

[11] Patent Number: 4,557,745

[45] Date of Patent: Dec. 10, 1985

[54] BENDING OF GLASS SHEETS ON A SHAPING BED CONSISTING OF ROTATING ELEMENTS

[75] Inventors: Friedrich Halberschmidt, Herzogenrath; Josef Audi, Aachen, both of Fed. Rep. of Germany; Herbert Radermacher, Faeren, Belgium; Norbert Schwarzenberg, Herzogenrath, Fed. Rep. of Germany

[73] Assignee: Saint-Gobain Vitrage, Courbevoie, France

[21] Appl. No.: 669,872

[22] Filed: Nov. 9, 1984

[30] Foreign Application Priority Data

Nov. 9, 1983 [FR] France .................................. 83 17829

[51] Int. Cl.[4] .......................................... C03B 23/033
[52] U.S. Cl. ........................................ 65/104; 65/106; 65/245; 65/268; 65/273
[58] Field of Search ................. 65/104, 106, 107, 273, 65/245, 253, 268

[56] References Cited

U.S. PATENT DOCUMENTS

| 3,934,996 | 1/1976 | Frank ..................................... 65/106 |
| 4,015,968 | 4/1977 | Revells et al. .................... 65/273 X |
| 4,376,643 | 3/1983 | Kahle et al. ...................... 65/273 X |

Primary Examiner—Arthur Kellogg
Attorney, Agent, or Firm—Oblon, Fisher, Spivak, McClelland & Maier

[57] ABSTRACT

The invention relates to bending of glass sheets moving in a horizontal position. In a first phase glass sheets are bent on a shaping bed made up of rotating elements, then in a second phase these sheets are subjected to a complementary bending between two molds of a bending press. Air flow is used to help support the glass in the second phase.

19 Claims, 4 Drawing Figures

BENDING OF GLASS SHEETS ON A SHAPING BED CONSISTING OF ROTATING ELEMENTS

BACKGROUND OF THE INVENTION

1. Field of the Invention

This invention relates to bending of glass sheets brought to the deformation temperature, the sheets moving in horizontal or approximately horizontal position on a shaping bed made up of rotating shaping elements. The disclosure of this application is related to that of U.S. patent application Ser. No. 669,795, filed on the same date as the present application by the present Applicants and entitled "DEVICE FOR BENDING GLASS SHEETS".

2. Description of the Prior Art

Such a bending technique is described in French Pat. No. 2,312,463. Glass sheets advance on a shaping bed consisting of curved rods surrounded by deformable sheaths which are rotatably driven. These rods are progressively and increasingly raised to progressively bend the sheets until they have a cylindrical shape. This type of bending is particularly easy to obtain, the installation easy to handle and the output is high.

French Pat. No. 2,442,219 describes an installation derived from that described above, in which the glass sheets acquire a double bending, i.e., a crosswise bending of the type described above, by fitting the sheets to the profile of curved rods identical with those described above, placed crosswise to the direction of the sheets' advance. A lengthwise bending, i.e., in the direction of sheet advance is also provided, because the curved rods are placed one after the other in the direction of advance of the glass sheets, in a curved profile. This results in a double bending, in other words, a spherical bending for the glass sheets.

These known processes and devices do not make it possible to bend glass sheets except in a purely cylindrical or purely spherical configuration.

Further, since the amount of curvature of the glass sheets is a direct function of the configuration of the installation—inclination of the curved rods, profile of the lengthwise curvature, etc.—obtaining very precisely determined curvatures requires a precision and monitoring of the rod configurations all along the bending station.

SUMMARY OF THE INVENTION

The present invention has as its object, improvements in the processes and devices of the prior art so as to make it possible to obtain glass sheets bent in any configuration, possibly different from a cylindrical or spherical configuration, with very close tolerances and a satisfactory quality from the optical viewpoint, while being less dependent on the constancy and accuracy of the rod configuration adjustments.

For this purpose, the invention proposes a first phase of bending glass sheets with standard means such as rotating shaping elements consisting of curved rods surrounded by rotating sheaths, a cylindrical or spherical profile, a second phase of subjecting these sheets to a complementary bending by passage between the two molds of a bending press, the lower mold of this press in rest position being lowered below the contact surface of the rotating shaping elements and able to be brought into active position above this surface to be in contact with the upper mold of the bending press, then relowering the glass sheets, thus bent, onto the rotating shaping elements to convey them to the following treatment station.

Advantageously, a current of hot gas, generally air, exhibiting a uniform dynamic pressure profile, is blown vertically upward between the rotating shaping elements to take over at least partially the weight of the glass sheets placed on the rotating shaping elements.

The invention also proposes a device for using the process described above, this device including a shaping bed consisting of rotating shaping elements, those of the final portion of the shaping bed having spaces in which a lower mold of a bending press is housed under the surface of contact of the glass with the rotating shaping elements. The mold is associated with a lifting device able to lift the mold above this contact surface to bring it against a complementary upper mold belonging to the same bending press.

Advantageously a chamber for blowing hot gas in the direction of the glass sheets is placed at least under the final portion of the shaping bed. Thanks to the support of the glass sheets provided by blowing of gas, the support pressure of said sheets on the rotating shaping elements is very greatly reduced. Advantageously the hot gas current has such a flow rate that the dynamic pressure at the level of the glass is between 2 and 30 mm water gage; this results in the taking up of up to 80% of the weight of glass.

The shaping elements therefore can be made with recesses without any drawback, thus providing the glass with contact zones separated by spaces instead of the continuous support that normal shaping elements provide. In the final portion of the shaping bed these shaping elements consist of curved rods covered with rotating sheaths provided with rings shorter than the sheaths in length.

The ring-free zones of the curved rods then make it possible easily to house, below the surface of contact with the glass sheets, the lower mold of the press consisting solely of a frame. On the other hand, nothing prevents the countermold, i.e., the upper mold, from being a continuous surface. Thus it is possible to make glass sheets having shapes of curvatures that depart from the simply cylindrical or spherical curvatures, having a high optical quality, and with a high output.

A particularly important point of the invention resides in the formation of the gas current, which should have a profile of very uniform dynamic pressure at the level of the glass. This gas is blown at a temperature above 600° C. and is advantageously aspirated above the sheets for recycling.

BRIEF DESCRIPTION OF THE DRAWINGS

Various details and advantageous embodiments of the invention will be described in the following description given in connection with the Figures which show.

DETAILED DESCRIPTION OF THE PREFERRED EMBODIMENT

Figure 1:
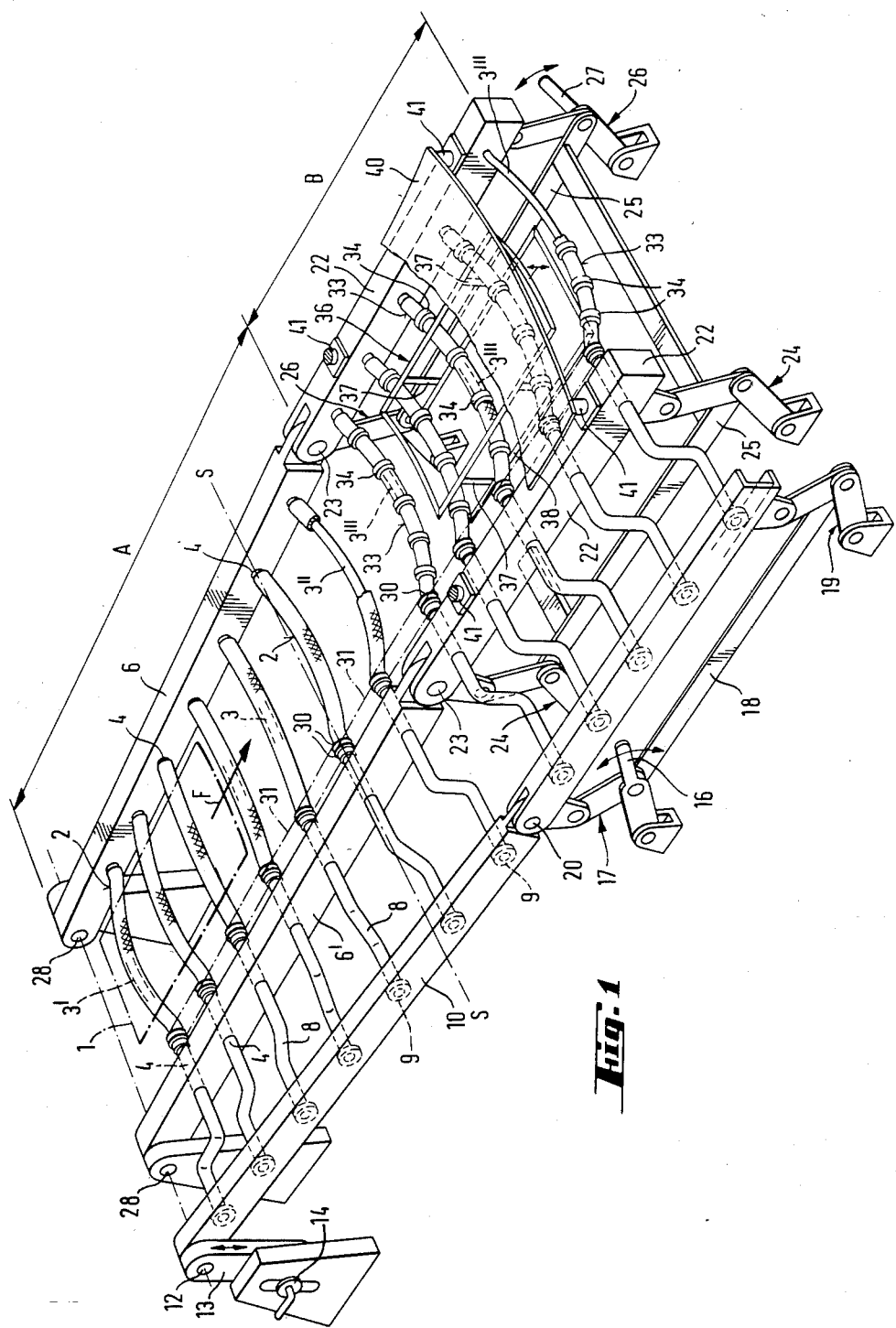
FIG. 1 is an overall view in perspective of a shaping bed made up of rotating tubular sheaths mounted on curved rods with variable inclination and including a downstream complementary bending device consisting of a mold in the shape of a frame and a solid-surface countermold.

FIG. 1 shows the basic structure of a bending installation according to the invention. However, for clarity in the drawing, the furnace in which the installation is placed and the structure necessary for production of the rising hot gas flow in its last part have not been shown.

In this installation, glass sheets 1, which rest on rotating shaping elements constituting the shaping bed, are conveyed in the direction of arrow F. The rotating shaping elements are flexible tubular sheaths 2, rotating around curved rods 3. In the embodiment shown, all curved rods 3 have the same shape and the same radius of curvature. Each curved rod 3 has two ends 4, which are straight in relation to the curved median part of the rod, so as to be coaxial with one another, thus determining a pivoting axis S-S' around which rod 3 can be pivoted. Ends 4 of rods 3 are carried by a frame consisting of two elongated beams 6 and 6' and these ends 4 are free to pivot in bearings 5 held in two beams 6 and 6'. On the outside of frame 6-6' one end of each curved rod is fitted on a crank 8 ending in a roller 9 which can travel in a U-section rail, placed lengthwise, i.e., in the direction of advance of glass sheets 1 shown by arrow F. The rail portion in a first part A of the installation is referenced as 10, as in a second part B is referenced as 11.

The curved rods are progressively increasingly inclined so as to present to glass sheets 1 an increasingly greater curvature in the crosswise direction. Thus, the first curved rod 3 of part A, referenced as 3', is lying substantially in the conveying plane which contains the glass sheets arriving from upstream in the installation, so that the line of contact of this first rod 3' with glass sheets 1 is practically in this conveying plane. With the advance of the sheets in the installation, the angular position of curved rods 3 is modified and they are increasingly inclined to reach a maximum inclination at the level of the last curved rod 3 of part A, a rod referenced to as 3". This maximum inclination depends on the radius of curvature desired for glass sheets 1.

In this embodiment, the shaping bed is a concave bed.

To modify the position of the assembly of curved rods 3 simultaneously to give them an inclination whose angle varies progressively and uniformly from one rod to the next, rail portion 10 is mounted so as to be able to be inclined in relation to the plane of frame 6-6'. For this purpose, rail portion 10 is provided with a joint 12 enabling it to pivot around a horizontal axis ZZ' placed crosswise at the head of the bending installation. This joint 12 is generally adjustable in height; it is carried by an arm 13 that can be locked at the desired height in relation to a fixed element 15 by tightening a screw 14. A lever 16 of a toggle joint mechanism 17, 18 and 19, described in more detail below, serves to provide pivoting of rail 10 around axis ZZ'. Rail portion 11, within which end rollers 9 of curved rods 3 travel in part B of the installation, is hinged on a pivot 20 on the downstream end of rail portion 10. The height of rail portion 11 can be changed without changing the inclination of rail portion 11, particularly while retaining rail portion 11 horizontal, by acting on lever 16, which controls the shape of two contiguous parallelograms.

The first parallelogram is formed by connecting rod 18, two links 17 each attached at two points spaced from rail portion 11, and rail portion 11 constituting the fourth side. The second parallelogram is formed by connecting rod 18 which is common to the two parallelograms, an arm 19 and lever 16, the fourth side being formed by an unreferenced portion of a fixed frame located between two stationary points 21 for fastening of arm 19, on the one hand, and lever 16, on the other hand.

Because of the movement of rail portion 11 does not change its inclination, the inclination of all curved rods mounted in part B of the mounting installation and referenced as 3''' is modified by the same value, so that all these curved rods 3''' have the same inclination, an inclination that, moreover, is identical with that of curved rod 3", the last curved rod 3 of part A of the shaping bed.

Of course, other linkages making possible a progressive height adjustment of rail portion 11 and a progressive inclination of rail portion 10 could be used instead of toggle joint mechanism 16, 17, 18 and 19.

Curved rods 3''' of part B of the shaping bed are mounted to pivot in a frame 22 which is hinged around joints 2' on the downstream end of frame 6-6' of part A of the shaping bed. This frame 22 is mounted on a toggle joint mechanism 24, 25 and 26 of the same type as the one that carries rail 11. This mechanism 24, 25 and 26 can be operated by a lever 27, which raises or lowers frame 22 without changing its inclination or orientation, and which also modifies the inclination of frame 6-6' of first part A of the shaing bed by making it pivot around joints 28, located at the head of the installation on axis ZZ'. Thus, it is possible to modify the radius of curvature of the shaping bed in a simple manner. It is also possible, by proper adjustment of the above linkages to choose to maintain at the same horizontal level either the lengthwise edges of the glass sheets or the zone close to the central axis of the sheets.

As already indicated, flexible tubular metal mesh sheaths 2, which are resistant to twisting, cover curved rods 3 and are driven to rotate around these rods 3, by sprocket 30 to which the sheaths are fixed and which engage one or more driven chains 31.

The flexible tubular sheaths that also cover curved rods 3''' of portion B of the shaping bed are referenced as 33. Rings 34 are slipped on and fastened to these the sheaths 33. These rings 34, which can be narrow or longer and resemble true portions of cylindrical rollers, slide on sheaths 33 in the lengthwise direction of the sheaths, which makes it possible to fasten them at any place on said sheaths. Due to this arrangement, spaces exist between sheaths 33 and lower surfaces of glass sheets 1 conveyed by being supported on rings 34. The beams of a mold 36, particularly in the form of a frame belonging to a bending press, are housed in these spaces. Mold 36 is mounted on a frame 38 by supports 37, said frame 38 being vertically movable under the action of lifting means (not shown). A countermold 40 with a solid surface is provided above lower mold 36 which can be lifted and pressed against upper countermold 40. This countermold 40, which is shown only partially to avoid cluttering the Figure, rests on frame 22 by supports 41.

Figure 2:
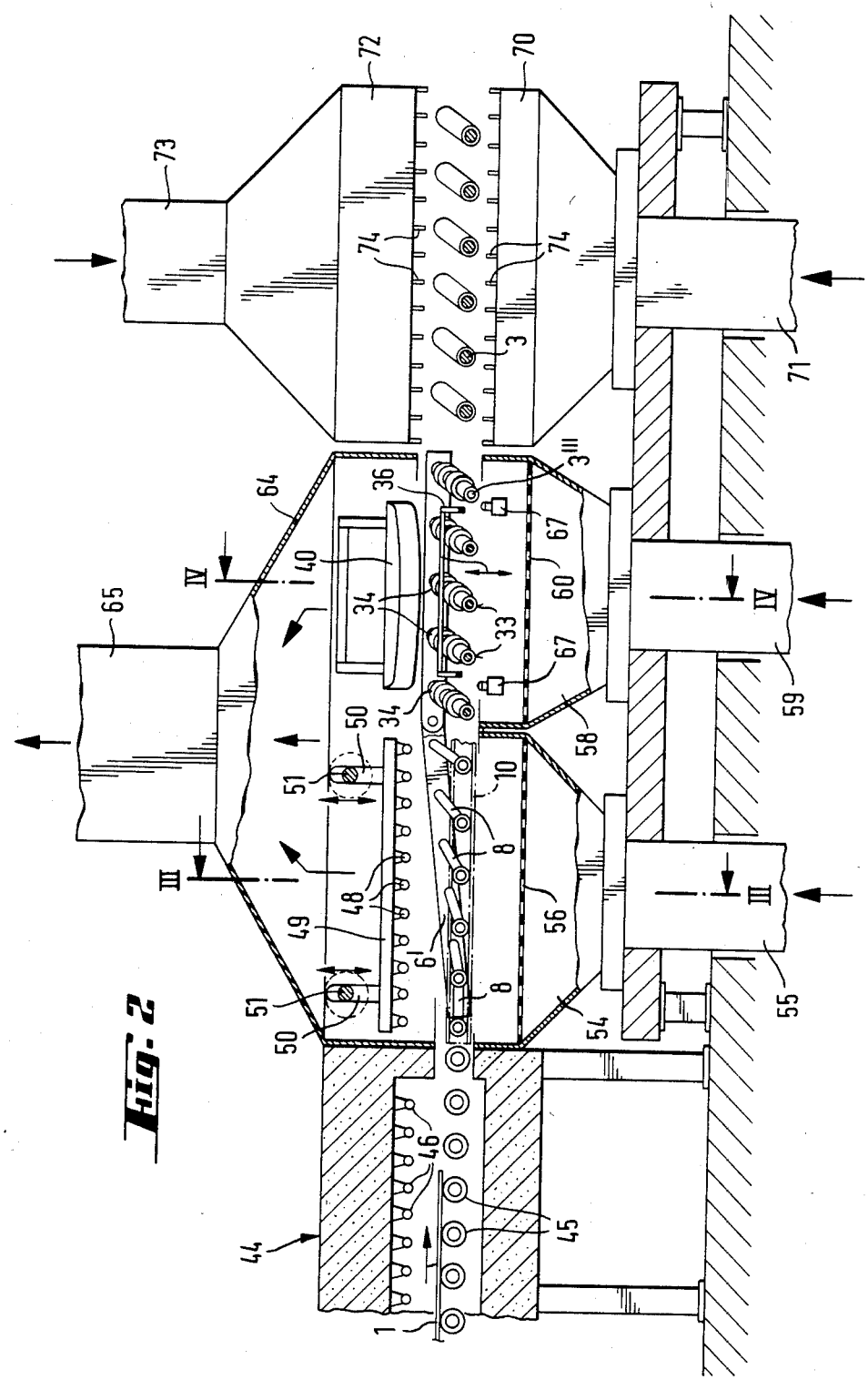
FIG. 2 is a longitudinal section of a bending installation according to the invention, including the heating and cooling station.

With the curved rods defining a concave shaping bed, countermold 40 is convex. FIG. 2 shows how a bending installation according to the invention and similar to the one described in connection with FIG. 1 is incorporated in an industrial line for making bent and tempered glass.

The complete line comprises a furnace 44 for heating glass sheets 1, the furnace including cylindrical conveyor rollers 45 driven in rotation, and heating elements 46 which bring the glass to its bending temperature. A bending installation such as described above in connection with FIG. 1 is numbered as 47 and a tempering station as 75.

In the first part A of the curving installation, for greater clarity of the drawing, only beam 6' of frame 6-6' carrying curved rods 3, the rods 3 themselves, and rail portion 10 in which rollers 9 travel, are shown. The mechanisms making it possible to adjust the position of frame 6-6' and that of rail portion 10 are omitted and will be again be referred to only later in connection with FIG. 3.

Heating elements 48 for heating by radiation are provided in this portion A of the curving installation and are adjustably held by supports 49, 50 and 51.

Below this portion A is provided structure for blowing hot air at a temperature of about 650° C. to help support and maintain the temperature of glass sheets 1. For this purpose, enclosure 56 in the shape of a funnel, fed hot air from below by a feed pipe 55 and covered at its upper part by a plate 56 pierced with uniformly placed holes, is placed under this portion A at a distance from the path taken by glass sheets 1. The delivery of hot air is regulated by blowers (not shown). A hot air flow is thus created which exhibits a pressure with a homogeneous, uniform profile on the order of 2 to 30 mm water gage with practically only a dynamic component at the level of the lower face of glass sheets 1 that pass supported on tubular sheaths 2 covering curved rods 3. As a result a considerable part of the weight of glass sheets 1 can be taken over by this hot air flow.

Analogously, a funnel-shaped enclosure 58 fed hot air at around 650° C. in its lower part by a feed pipe 59 is placed under portion B of the shaping bed in which, for greater clarity in the drawing, only tubular sheaths 33, rings 34 provided on these sheaths 33, lower mold 36 in the shape of frame and upper countermold 40, are shown. A perforated plate 60 closes the upper part of this enclosure 58 and assures the distribution of a vertical hot air current, rising in the direction of glass sheets 1, which is homogeneous and uniform at the level of said glass sheets. This hot air current acts in opposition to the weight of glass sheets 1 so that rings 34 are only slightly loaded by these glass sheets 1, which thus have no harmful impact.

Above this bending station is mounted a hood 64 connected to an evacuation pipe 65 intended to aspirate the hot air currents sent through perforated plates 56 and 60.

Advantageously, this hot gas recovered in pipe 65 is conducted in conduits (not shown), recycled and after heating, brought back into enclosures 54 and 58 by pipes 55 and 59.

On the inside of second portion B of the shaping bed are provided sensors 67 which detect the correct positioning of glass sheets 1 between lower mold 36 and upper mold 40 of the bending press. As soon as a glass sheet 1 is detected as being exactly above lower mold 36, means for lifting frame 38 supporting mold 36 are activated, which has the effect of pressing glass sheet 1 against solid-surface mold 40 to give the glass sheet its final shape. Lower mold 36 is then lowered and brought back to its initial position in the spaces made between rings 34. As a result, glass sheet 1 is again placed on rings 34 which rotate and convey it to tempering station 75 located downstream. In tempering station 75, conveying of glass sheets 1 is performed in the same way as in first part A of the shaping bed, i.e., on tubular sheaths 2 rotating around curved rods 3. The means for controlling curved rods 3 are not shown in FIG. 2, for greater clarity but may be similar to those described above. Tempering station 75 essentially comprises a lower blowing box 70 fed pressurized cold air by feed pipe 71 and an upper box fed pressurized cold air by feed pipe 73. The cold air is delivered in the standard way by ramps of tubular nozzles 74 or slit nozzles and the cooling undergone by the glass sheets causes their tempering.

The structure and functioning of the bent and tempered glass production line, in particular at the level of first part A of the bending installation are further described below in connection with FIG. 3.

Figure 3:
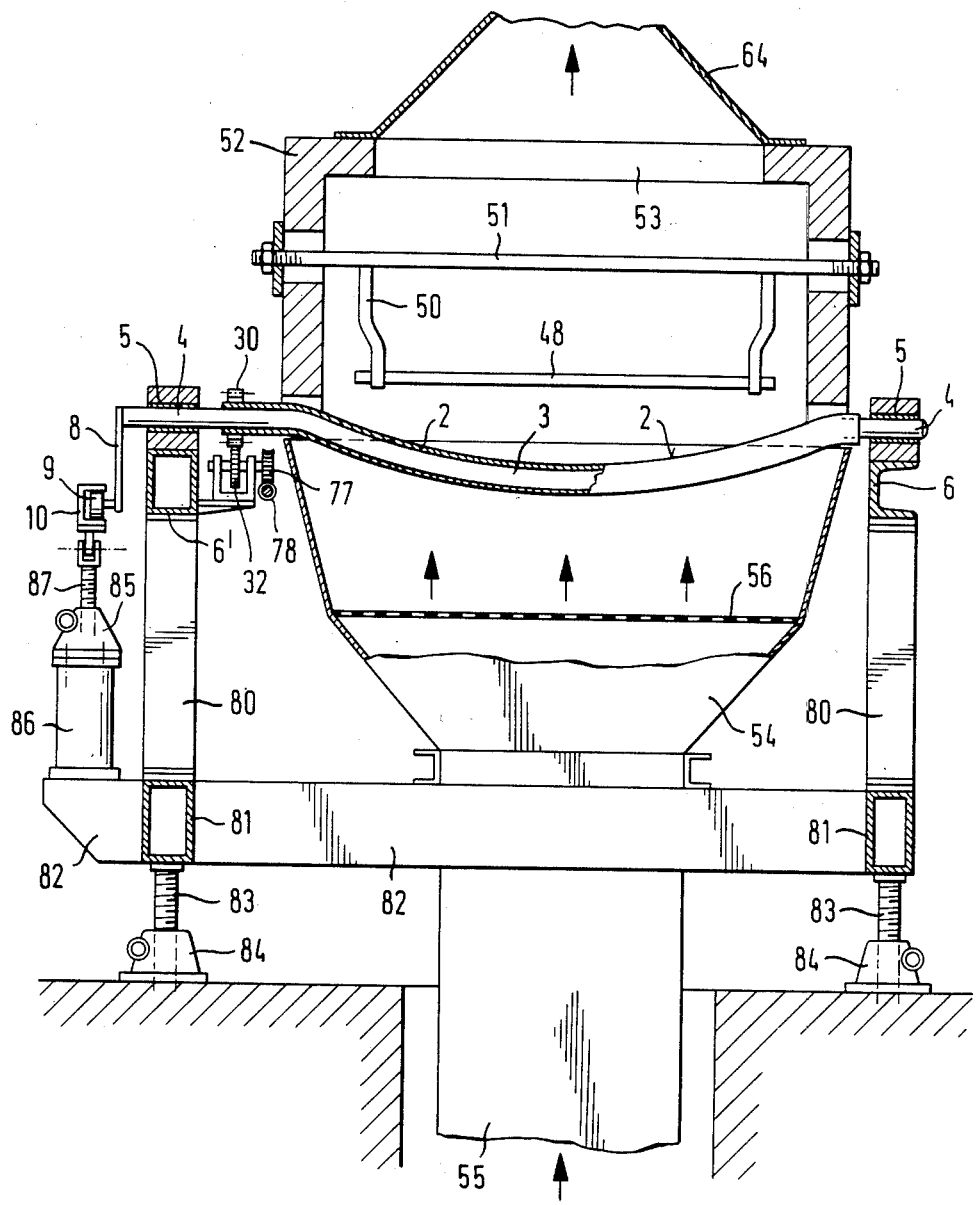
FIG. 3 is a vertical section along line III—III of FIG. 2 showing a first part of the bending station.

FIG. 3 shows curved rods 3 whose aligned ends 4 pivot in bearings 5 belonging to frame 6-6' These curved rods 3 are held in the desired angular position by cranks equipped with rollers 9 engaged in U-shaped rail portion 10. Tubular sheaths 2 are mounted on these rods 3, and gears 30 fixed to said sheaths engage with gear wheels 32 connected to gears 77 engaged with worm screws 78 coupled to a drive shaft to drive the sheaths in rotation.

Frame 6-6' carrying the shaping bed is mounted by supports 80 on frame 81 and 82. This frame 81 and 82 is placed on rods 83 of jacks 84 which make a height adjustment possible.

In an identical way, rail 10 can be adjusted in height with a jack 85. Jack 85 rests by support element 86 on frame 81 and 82 and acts on rail 10 by its rod 87.

Above curved rods 3 are placed heating means 48 fastened by supports 50 and 51 to refractory part 52 of the chamber that encloses part A of the bending station.

In the upper wall of this structure 52 is made a wide opening 53 through which the hot air helping support glass sheets 1 reaches aspiration hood 64. This hot air goes by feed pipe 55 into funnel-shaped enclosure 54 which is covered by perforated distribution plate 56.

Figure 4:
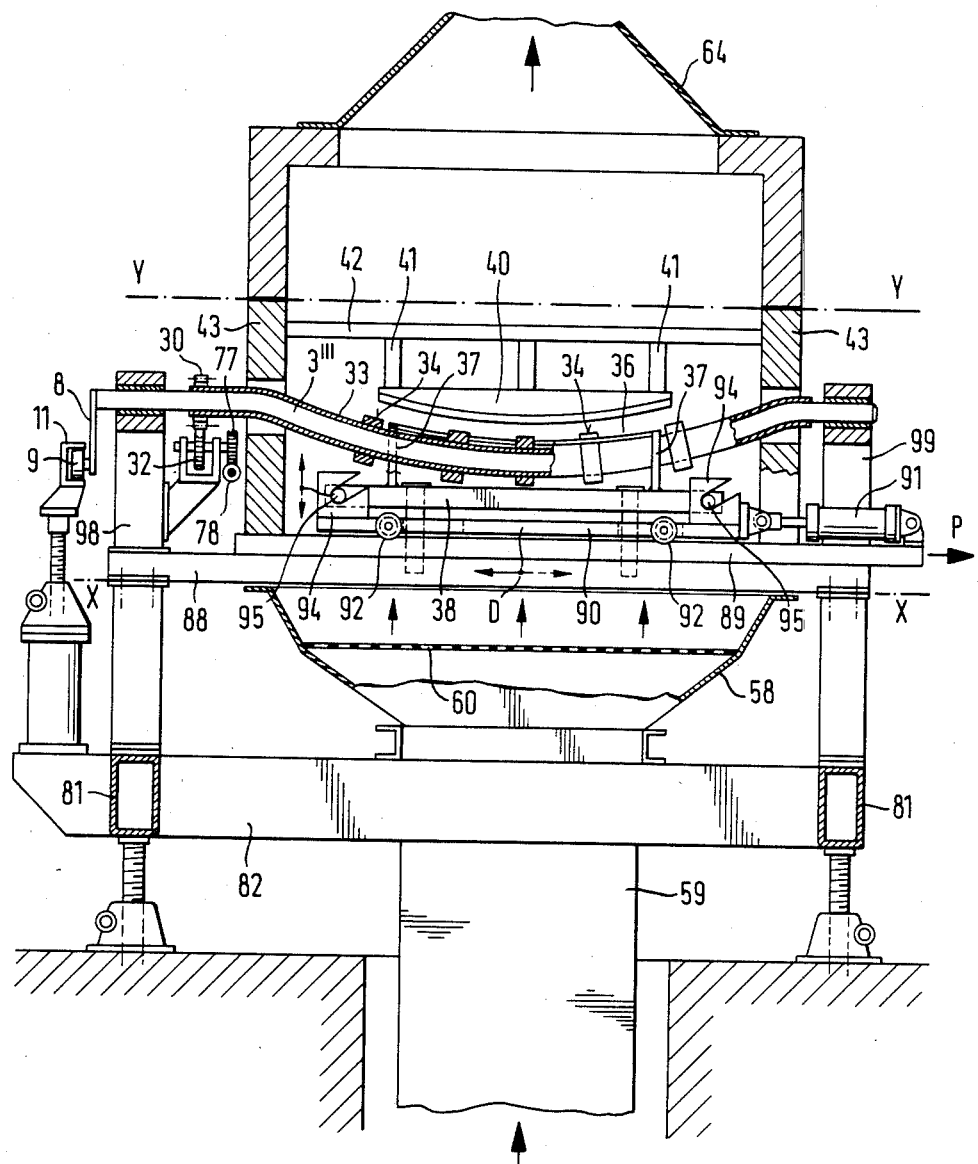
FIG. 4 is a vertical section of the final part of the bending station seen along line IV—IV of FIG. 2.

The last part B of the bending station equipped with the bending press is shown in detail in FIG. 4. In the particular embodiment shown, the bending press is provided so as to be changed quickly in case of a change of the model of glass manufactured, the new press put in place having the form of the new model of glass to be manufactured. This part B is thus considered as an interchangeable unit.

The assembly of bending means of part B, i.e., curved rods 3''' covered with flexible tubular sheaths 33 and their rings 34, lower mold 36 and upper mold 40 of the bending press are carried by a frame 88 that can be removed from the installation by a translation along the direction of arrow P. The lower surface of frame 89 separates from the installation along a plane X-X', and the upper plane of separation is along plane Y-Y'. During such removal of the bending means, end rollers 9 of cranks 8 also disengage from U-shaped rail portion 10.

Frame 88 is equipped with bars 89 on which a carriage 90, equipped with wheels 92, travels in the direction defined by double arrow D under the action of a pneumatic jack 91. This carriage 90 carries stops 94 provided with oblique slots in which horizontal pins 95 can slide which belong to frame 38 carrying lower mold 36. By the action of jack 91, frame 38, which cannot move in direction D, is caused to rise or descend, pins 95 being made to slide in the oblique slots of stops 94.

Countermode 40 is fastened by parts 41 to support shapes 42 which are fastened to side walls 43 of the chamber that encloses part B of the bending station. These side walls 43 also rest on frame 88 in the same way as frame 98 carrying bearings 99 in which curved rods 3''' pivot.

In this portion B of the bending station, the means for producing, distributing and guiding the gas current helping support glass sheets 1 are particularly important.

Good results are obtained when the air used for support is heated to a temperature of 620° to 660° C. by heating means located below funnel-shaped enclosure 58. In enclosure 58, the excess pressure is adjusted as a function of the pressure desired at the level of the glass sheets, this latter being a function of the weight of the glass sheets and the fraction of this weight that it is desired to take over. This pressure at the level of the glass is practically only dynamic and the excess pressure in enclosure 58 is adjusted to between 10 and 60 mm water gage (WG) and preferably between 15 and 30 WG, for example 25 mm WG (or 250 Pa). With these excess pressures, pressures of 2 to 30 mm WG, able to take over 20 to 80% of the weight of the glass sheets, can be noted at the level of the glass. Perforated plate 60 is located at a distance from glass sheets 1 so that the pressure experienced by said glass sheets is practically only dynamic, the static component being negligible. Distances of 100 to 250 mm or 300 mm may be currently used.

The perforations of plate 60 have a diameter of 12 to 15 mm and are distributed at an even pitch of 25 to 35 mm in the crosswise and lengthwise directions.

Thus, the air jets leaving the perforations meet and partially overlap, providing a homogeneous, uniform flow at the level of the glass. The parameters of pressure, distance, and diameter of the perforations are, of course, identical to the first part A of the bending station. The invention described also applies to bending installations in which curved rod 3 has its own system for adjustment of inclination. The invention also applies to installations in which rods 3 are not all identical but exhibit different curvatures.

Also the bending press and/or hot air blowing system to help support the glass sheets can be used in an installation imparting both a crosswise curvature and a lengthwise curvature to the glass sheets. In this case, the bearings in which the curved rods pivot are no longer aligned but are placed on a curved frame in the lengthwise direction of advance of the glass sheets.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for bending a horizontally oriented sheet of glass, comprising the steps of:
    conveying in a first direction a sheet of glass heated to a conveying temperature onto a shaping bed having rotating shaping elements, said shaping elements being curved and extending transverse to said conveying direction;
    using said shaping elements to preliminarily curve said sheet;
    conveying said preliminarily shaped sheet to a position above a lower frame shaped mold of a bending press, said position being below an upper solid-surface countermold of said press;
    raising said lower frame sufficiently to press said sheet against said upper countermold so as to finally shape said sheet; and
    lowering said lower frame.

2. The process of claim 1 including the step of supplying to a lower surface of said sheet positioned above said lower frame a rising hot gas current having a substantially uniform dynamic pressure at the level of the lower surface of said sheet, whereby a substantial portion of the weight of said sheet is supported by said hot gas current.

3. An apparatus for bending a horizontally oriented sheet of glass, comprising:
    a shaping bed having a plurality of shaping elements, said shaping elements being rotatable about parallel axes to convey a glass sheet in a conveying direction transverse to said axes, said plurality of shaping elements being spaced along said conveying direction and having portions curved out of alignment with said axes;
    means for providing spaces between said shaping elements of a downstream portion of said shaping bed and a lower surface of said sheet;
    a mold member positionable in said spaces;
    a convex solid surface countermold positioned above said mold member and above said sheet when said sheet is on said shaping elements of said downstream portion; and
    means for raising said mold member to said countermold so as to press a glass sheet therebetween.

4. The apparatus of claim 3, including an enclosure containing pressurized hot gas and having means for emitting jets of said gas in the direction of the lower face of the glass sheet, said enclosure being positioned below said downstream portion of the shaping bed.

5. The apparatus of claim 4 wherein an upper part of said enclosure containing said hot gas is closed by a perforated plate located at a distance on the order of 100 to 300 mm below the surface of contact of the shaping elements with said glass sheet.

6. The apparatus of claim 4 including an aspiration hood for hot gas mounted above said downstream portion of said shaping bed, and conduit means for returning hot gas from said hood to said enclosure.

7. The apparatus of claim 3 wherein said shaping elements are made up of flexible tubular sheaths which rotate around curved rods wherein said means for providing spaces comprise rings mounted on said tubular sheaths.

8. The apparatus of claim 7 wherein said rings are slidably mounted on said tubular sheaths and include means for fastening said rings to said sheaths.

9. The apparatus of claim 7 wherein said curved rods have a fixed curvature and are mounted so as to be pivoted about said axes, said pivoting causing a variation in the curvature of said shaping bed.

10. The apparatus of claim 3 wherein said shaping elements in an upstream portion of said shaping bed are arranged to provide a progressively increasing degree of curvature for said sheet in said conveying direction, and wherein said shaping elements in said downstream portion are arranged to provide a constant degree of curvature for said sheet in said conveying direction.

11. The apparatus of claim 3 including glass position sensors in said downstream portion.

12. The apparatus of claim 3 including means for interchanging said downstream portion with another downstream portion.

13. The apparatus of claim 12 wherein said means for interchanging include a frame supporting said downstream portion.

14. The apparatus of claim 5 including an aspiration hood for hot gas mounted above said downstream portion of said shaping bed, and conduit means for returning hot gas from said hood to said enclosure.

15. The apparatus of claim 4 wherein said shaping elements are made up of flexible tubular sheaths which rotate around curved rods wherein said means for providing spaces comprise rings mounted on said tubular sheaths.

16. The apparatus of claim 8 wherein said curved rods have a fixed curvature and are mounted so as to be pivoted about said axes, said pivoting causing a variation in the curvature of said shaping bed.

17. The apparatus of claim 4 wherein said shaping elements in an upstream portion of said shaping bed are arranged to provide a progressively increasing degree of curvature for said sheet in said conveying direction, and wherein said shaping elements in said downstream portion are arranged to provide a constant degree of curvature for said sheet in said conveying direction.

18. The apparatus of claim 4 including glass position sensors in said downstream portion.

19. The apparatus of claim 4 including means for interchanging said downstream portion with another downstream portion.

* * * * *